United States Patent [19]

Miura

[11] Patent Number: 4,459,017

[45] Date of Patent: Jul. 10, 1984

[54] MAGNIFICATION CHANGING DEVICE IN A COPYING MACHINE

[75] Inventor: Tsutomu Miura, Kanagawa, Japan

[73] Assignee: Fuji Xerox Co., Ltd., Tokyo, Japan

[21] Appl. No.: 364,695

[22] Filed: Apr. 2, 1982

[30] Foreign Application Priority Data

Aug. 5, 1981 [JP] Japan ................................ 56-121805

[51] Int. Cl.³ ........................ G03B 27/36; G03B 27/38

[52] U.S. Cl. .................................. 355/58; 354/195.12

[58] Field of Search ........................ 355/55, 56, 58, 59; 354/195

[56] References Cited

U.S. PATENT DOCUMENTS

| | | | |
|---|---|---|---|
| 2,572,992 | 10/1951 | Doornbos | 355/58 |
| 4,099,866 | 7/1978 | Jones et al. | 355/58 |
| 4,322,150 | 3/1982 | Kamata et al. | 354/195 |

*Primary Examiner*—Richard A. Wintercorn
*Attorney, Agent, or Firm*—Sughrue, Mion, Zinn, Macpeak & Seas

[57] ABSTRACT

A magnification changing device for a copying machine has a cam receiver which rides in a cam groove of a driving cam groove cylinder. A cam member is coupled to a bell crank which is, in turn, coupled through a connecting rod to a carriage supporting a main lens. The cam groove has a perpendicular portion, which is in a plane perpendicular to the axis of rotation of the cam groove cylinder, over a predetermined distance in a circumferential direction of the cam groove at a preset magnification setting position. As the cam groove cylinder is rotated, the cam receiver follows the cam groove until the cam receiver reaches the perpendicular portion of the cam groove, which accurately positions the lens.

9 Claims, 2 Drawing Figures

MAGNIFICATION CHANGING DEVICE IN A COPYING MACHINE

BACKGROUND OF THE INVENTION

1. Field of the Invention

The present invention relates to a device for varying the position of a main lens in a copying machine in order to change the copying magnification.

2. Description of the Prior Art

In a conventional magnification changing device for a copying machine, a carriage supporting a main lens is moved on guide rails by a lead screw or a ball screw, and the carriage is stopped at a predetermined magnification position by a limiter or the like. However, it is difficult to stop the carriage accurately at a set position with such a screw, and the stop position is always inaccurate due to backlash.

In addition, the screw produces a loud noise when it starts or stops rotating, and the optical system may be adversely affected by the impact which is caused when the screw stops. Thus, the conventional magnification changing device has many disadvantages.

SUMMARY OF THE INVENTION

The present invention is intended to eliminate the above-described difficulties inherent in a conventional magnification changing device.

In accordance with the invention, a cam receiver is coupled to a carriage slidably supporting a main lens barrel. The cam receiver rides in a cam groove of a driving cam groove cylinder. The cam groove has a perpendicular portion, which is a plane perpendicular to the axis of rotation of the cam groove cylinder, over a predetermined distance in a circumferential direction of the cam groove cylinder at a predetermined magnification setting position. An adjusting cam member is mounted on one end of a bell crank which is, in turn, coupled at the other end through a connecting rod to the slidable main barrel. As the cam groove cylinder is rotated, the cam receiver follows the cam groove until it reaches the perpendicular portion of the cam groove, thereby accurately positioning the lens barrel, i.e., the main lens. The bell crank is biased by a spring so that the adjusting cam member is in contact with an adjustable rod fixed by adjusting screws which pass through elongated holes. Fine adjustment of the main lens can be achieved by loosening the adjusting screws and moving the adjustable rod so as to move the bell crank against the biasing force of the spring. This latter movement moves a lens barrel relative to the carriage.

The device so constructed produces very little noise. In addition, jarring of the lens positively is prevented since the carriage is not stopped by a limiter or the like.

DESCRIPTION OF THE PREFERRED EMBODIMENT

Figure 1:
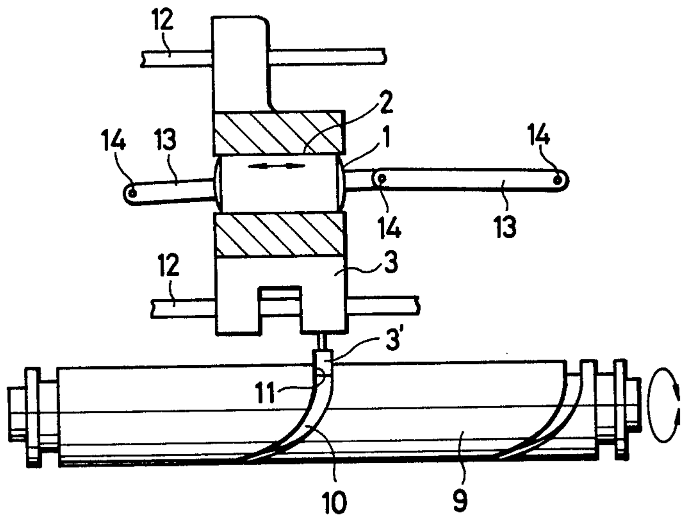
FIG. 1 is a plan view of an embodiment of the present invention showing an arrangement of a magnification changing device in a copying machine.
Figure 2:
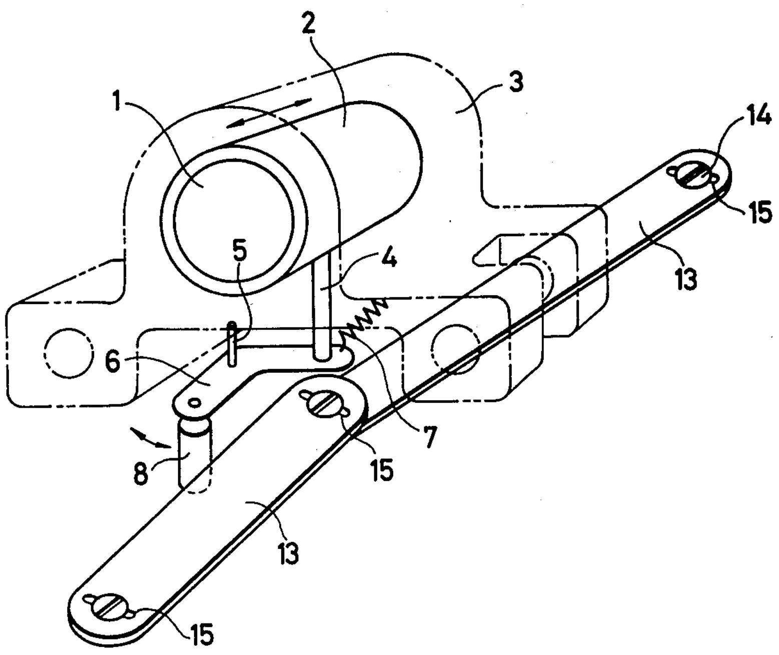
FIG. 2 is a perspective view of the magnification changing device shown in FIG. 1.

Referring to FIGS. 1 and 2, a main lens 1 is supported through a lens barrel 2 by a carriage 3. A cam receiver 3′ comprises a rotatable roller. The carriage 3 is slidable along a pair of guide rails 12. A cam groove cylinder 9 is located parallel to the axis of the main lens 1 and the guide rails 12. The cam groove cylinder 9 is turned in a forward or reverse direction by a drive means (not shown). The cam groove cylinder 9 has one or more cam grooves 10 therein. Each cam groove 10 has a perpendicular portion 11 which is in a plane perpendicular to the axis of rotation of the cam groove cylinder 9. Each perpendicular portion 11 is formed over a predetermined distance in a circumferential direction of the cam groove cylinder 9 at a predetermined magnification setting. The carriage 3 and the cam groove cylinder 9 are so disposed that the cam receiver 3′ is engagable with the cam groove 10.

The lens barrel 2 is slidable in the carriage 3. A main lens connecting rod 4 is connected to the lens barrel 2 and is pivotally mounted on one end of a right angle L-shaped bell crank 6. A spring 7 is connected between the bell crank 6 and the carriage 3 so that the bell crank 6 is urged to turn in one direction. The connecting part of the spring to the bell crank 6 is positioned in the vicinity of the axis of the connecting rod 4 for adjusting a position of the main lens. An adjusting cam member 8 is pivotally mounted on the other end of the bell crank. Thus, the bell crank 6 is rotatable about a pivot pin 5 so that the cam member 8 is moved along a side edge of a center rod 13 while being in contact therewith. In the embodiment shown, two center rods 13 are provided below the carriage 3.

In operation, the carriage 3 and the lens barrel 2 are both moved simultaneously by turning the cam groove cylinder 9 in a predetermined direction. The rotation of the cylinder 9 is stopped when the cam receiver 3′ reaches a desired perpendicular portion 11. Since the cam receiver 3′ and the bell crank 6 are coupled directly to the carriage 3, the carriage 3 is moved in the longitudinal direction of the cylinder 9 and stopped correctly at the preset magnification position.

After the carriage 3 has been stopped as described above, the position of the main lens 1 can be finely adjusted by moving the lens barrel 2 relative to the carriage 3. This relative movement is accomplished by loosening adjusting screws 14 which pass through and fix the adjustable rods 13. The position of the adjustable rods 13 is appropriately adjusted by utilizing the elongated holes 15, through which the adjusting screws 14 are inserted when fixing the position of the adjustable rods.

Specifically, changing or adjusting the position of the adjustable rods 13 causes the bell crank 6 to turn about the fixed pivot pin 5 as indicated by the arrow in FIG. 2 since the cam member 8 of the bell crank 6 is in contact with one of the adjustable rods 13. As the bell crank 6 is turned about the fixed pivot point 5, the cam member 8 is moved along the perpendicular portion 11 of the cam groove 10, which does not cause the carriage 3 to move significantly. However, the lens barrel 2, being connected to the connecting rod 4, is caused to move in a direction perpendicular to the movement of the cam member 8, which causes the lens barrel to move relative to the carriage 3 in the longitudinal direction. Thus, fine adjustment of the main lens is achieved.

As is clear from the above-described embodiment of the invention, the main lens carriage 3 is moved by the cam groove cylinder 9 and the perpendicular portion 11 formed in the cam groove 10 of the cam groove cylinder 9. Therefore, the carriage 3 is stopped accurately at the perpendicular portion. Fine adjustment is then made by loosening the adjusting screws 14 and moving the adjustable rods 13, thus causing the connecting rod 4 and the lens barrel 2 to move relative to the carriage 3. Accordingly, the main lens is positioned with high accuracy. Furthermore, the main lens is not jarred when stopped, as in the prior art devices. Therefore, the optical system is not jarred out of order when using the changing device of the present invention.

Since the cam means is employed to stop the carriage in the invention, the carriage and the lens are positioned precisely with little error because no backlash is generated by a limiter or the like, unlike prior art devices in which screw means is employed to stop the carriage.

Finally, the changing device of the present invention produces very little noise.

What is claimed is:

1. A magnification changing device for a copying machine, comprising:
   - a main lens;
   - a carriage supporting said main lens;
   - a cam receiver, said cam receiver being coupled to said carriage;
   - a driving cam groove cylinder having a cam groove, the cylindrical surface of said cylinder being adjacent to and to one side of said carriage and said lens, said cam groove of said cam groove cylinder being engaged with said cam receiver and having a first segment located at a predetermined magnification setting, said first segment being formed over a predetermined distance in a circumferential direction of said cam groove cylinder and being in a plane which is perpendicular to an axis of rotation of said cam groove cylinder, rotation of said cylinder causing said cam receiver to enter said first segment to achieve rough focusing of said lens; and
   - means for finely adjusting said focusing of said lens after said cam receiver enters said first segment and rotation of said cylinder is stopped.

2. The changing device claimed in claim 1 wherein said fine adjustment means includes a cam member, a bell crank having a bent portion, and a fixed pivot pin projecting from said bent portion of said bell crank, said cam member being connected to an end of said bell crank and said fixed pivot pin being connected to said carriage.

3. The changing device claimed in claim 2 wherein rotation of said cam groove cylinder causes said cam member, said bell crank, said carriage and said main lens to simultaneously move in a longitudinal direction of said cam groove cylinder.

4. The changing device claimed in claim 3 further comprising a lens barrel slidably disposed in said carriage and being supported thereby, said lens barrel supporting said main lens;
   - a connecting rod which is connected to an opposite end of said bell crank and is also connected to said lens barrel; and
   - means for rotating said bell crank causing said connecting rod, said lens barrel and said main lens to move in said longitudinal direction relative to said carriage.

5. The changing device claimed in claim 4 wherein said rotating means comprises an adjustable rod having elongated holes through which adjusting screws can pass for fixing a position of said adjustable rod, said adjustable rod being movable through a predetermined distance defined by a length of said elongated holes when said adjusting screws are loosened, said adjusting rod being in contact with said cam member of said bell crank, movement of said adjustable rod causing said bell crank to rotate.

6. The changing device claimed in claim 5 further comprising spring means for biasing said cam member against said adjustable rod.

7. The changing device claimed in claim 1 wherein said cam receiver comprises a rotatable roller.

8. The changing device claimed in any one of claims 1–7 wherein said cam groove has a plurality of perpendicular portions located at a plurality of predetermined magnification setting positions.

9. The changing device claimed in claim 1, wherein said cam groove has a second segment contiguous with said first segment which extends along a direction transverse to said plane, rotation of said cylinder causing said cam receiver to move from said second segment to said first segment, said cam receiver moving parallel to said axis only when in said second segment.

* * * * *